US008811366B2

(12) United States Patent
Ashrafi (10) Patent No.: US 8,811,366 B2
(45) Date of Patent: *Aug. 19, 2014

(54) SYSTEM AND METHOD FOR INCREASED BANDWIDTH EFFICIENCY WITHIN MICROWAVE BACKHAUL OF A TELECOMMUNICATION SYSTEM

(71) Applicant: Metropcs Wireless, Inc., Richardson, TX (US)

(72) Inventor: Solyman Ashrafi, Plano, TX (US)

(73) Assignee: MetroPCS Wireless Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,382

(22) Filed: Mar. 5, 2013

(65) Prior Publication Data

US 2013/0177009 A1 Jul. 11, 2013

Related U.S. Application Data

(63) Continuation of application No. 13/297,941, filed on Nov. 16, 2011, now Pat. No. 8,432,884.

(51) Int. Cl.
*H04W 4/00* (2009.01)

(52) U.S. Cl.
USPC ............................................................ 370/338

(58) Field of Classification Search
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| 5,978,117 | A   | * | 11/1999 | Koonen ........................ | 398/116 |
| 8,432,884 | B1  | * | 4/2013  | Ashrafi ......................... | 370/343 |
| 2009/0028332 | A1 | * | 1/2009  | Parker et al. ................... | 380/256 |
| 2010/0013696 | A1 | * | 1/2010  | Schmitt et al. .................. | 342/54  |
| 2013/0121330 | A1 | * | 5/2013  | Ashrafi ......................... | 370/343 |

* cited by examiner

*Primary Examiner* — Jung-Jen Liu
(74) *Attorney, Agent, or Firm* — Howison & Arnott, L.L.P.

(57) ABSTRACT

An apparatus for transmitting information in a wireless communication system includes a first interface for receiving a plurality of input data streams. Signal processing circuitry transmits and receives the plurality of input data streams on at least one frequency. Each of the plurality of input data streams on the at least one frequency have a different orbital angular momentum imparted thereto.

14 Claims, 7 Drawing Sheets

SYSTEM AND METHOD FOR INCREASED BANDWIDTH EFFICIENCY WITHIN MICROWAVE BACKHAUL OF A TELECOMMUNICATION SYSTEM

CROSS-REFERENCE TO RELATED APPLICATIONS

This application is a continuation of U.S. patent application Ser. No. 13/297,941, filed Nov. 16, 2011, entitled SYSTEM AND METHOD FOR INCREASED BANDWIDTH EFFICIENCY WITHIN MICROWAVE BACKHAUL OF A TELECOMMUNICATION SYSTEM, the specification of which is incorporated herein in its entirety.

TECHNICAL FIELD

The present invention relates to the microwave/satellite backhaul connections within a wireless telecommunication system, and more particularly, to a method for increasing the bandwidth within the microwave/satellite backhaul using multiple signals having different orbital angular momentums transmitted upon a same frequency.

BACKGROUND

Within wireless telecommunication systems, signals are transmitted from the base stations, which are in direct communications with the plurality of mobile devices within the telecommunications system to various network provider components, such as HLRs, MSC/VLR and base station controllers on conventional 2G & 3G networks and HSS, MME, CPG on new 4G networks. These components are in some cases interconnected via a backhaul connection that utilizes T1, Ethernet or variety of access methods including microwave or satellite links for providing the information between those components of the service provider's network. All such mediums are bandwidth limited, but more so on satellite or microwave links. These satellite or microwave links are bandwidth limited, according to the number of radio frequencies that are available within the connections. The ability to transmit additional information on the available microwave or satellite bandwidth without interfering with signals already being transmitted over the connections would greatly benefit the service providers by increasing their effective bandwidth without actually requiring additional frequencies in order to boost the system capacity.

SUMMARY

The present invention, as disclosed and described herein, in one aspect thereof, comprises an apparatus for transmitting information in a wireless communication system. A first interface receives a plurality of input data streams. Signal processing circuitry transmits and receives the plurality of input data streams on at least one frequency. Each of the plurality of input data streams on the at least one frequency have a different orbital angular momentum imparted thereto. A second interface outputs the at least one frequency having the plurality of input data streams each having the different orbital angular momentum imparted thereto.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for increased bandwidth efficiency within microwave backhaul of a telecommunication system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
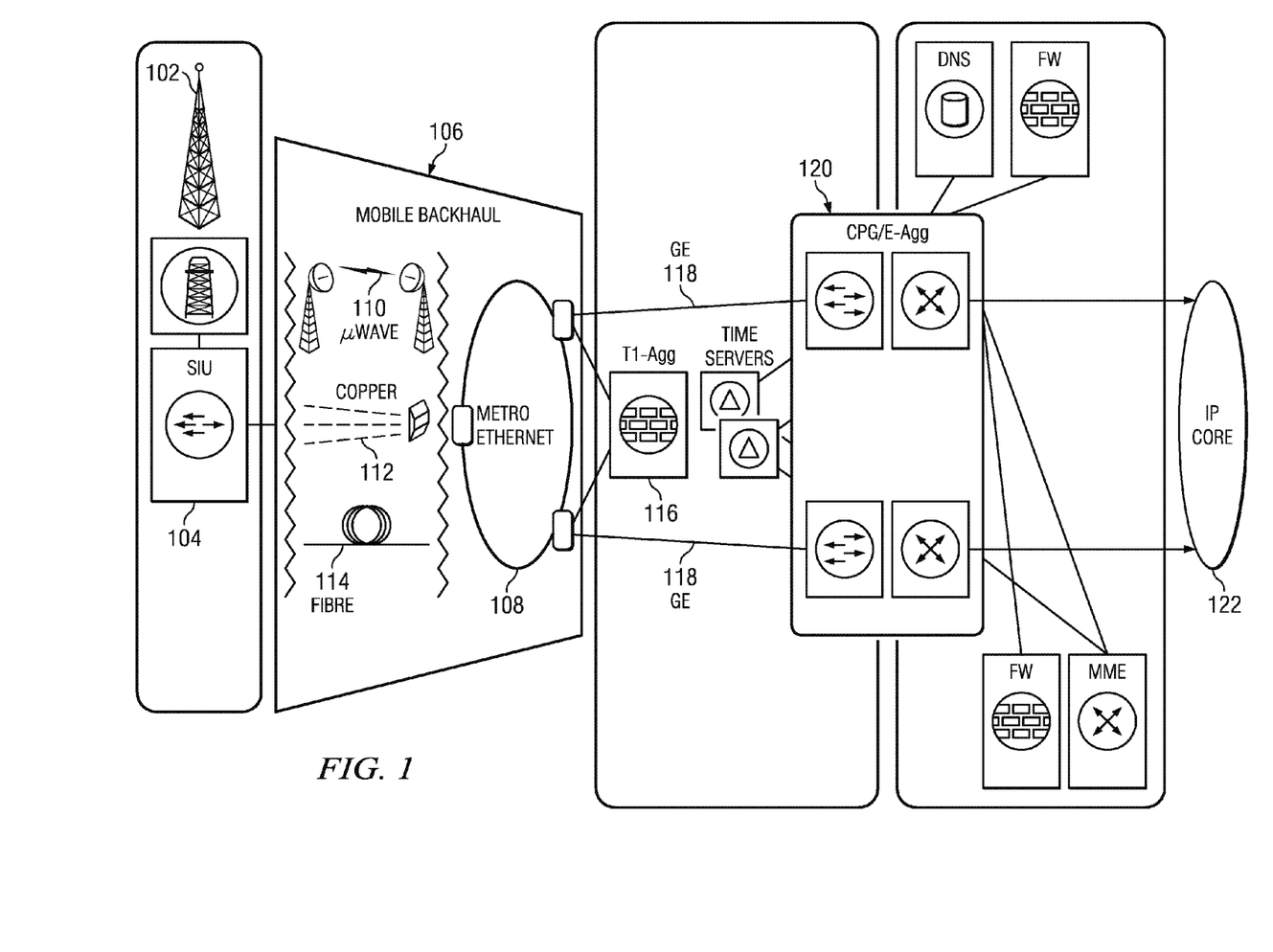
FIG. 1 is a block diagram of a wireless telecommunication system.

Referring now to FIG. 1, there is illustrated the network in which the below-described system may be used to provide the mobile backhaul with increased bandwidth. The RF portion of this system, including a cellular tower 102 and SIU 104, provides a means for wireless communication devices to interface with the provider network. The mobile backhaul section 106 provides for a connection between the SIU 104 and a metro Ethernet 108. The connection between the SIU 104 and metro Ethernet 108 may consist of a microwave connection 110, copper wire connection 112 or fiber connection 114. By utilizing the system, as described hereinbelow, the bandwidth over the microwave connection 110 between the SIU 104 and metro Ethernet 108 may be increased. The metro Ethernet 108 connects signals over the mobile backhaul 106 to/from a T1 aggregate 116 and GE (Gigabit Ethernet) lines 118 to the CPG/E-AGG (Combined serving and packet gateways/Aggregation router) 120. The CPG/E-AGG 120 provides a connection to an IP core 122 for providing IP communications.

Figure 2:
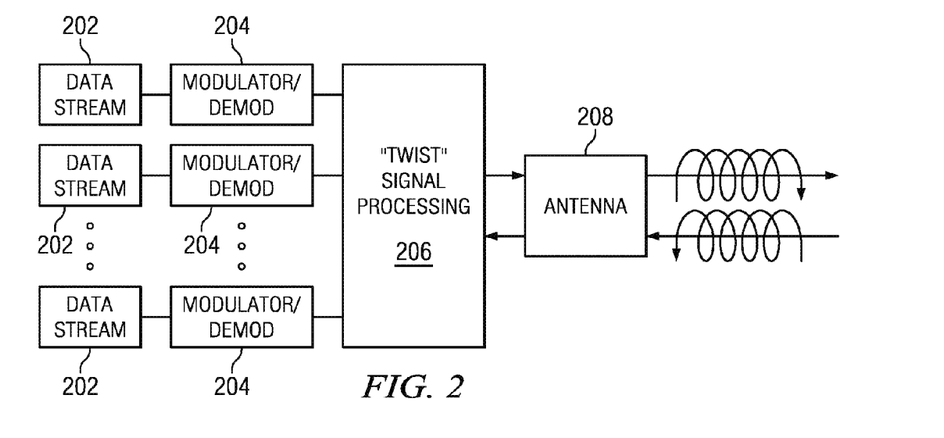
FIG. 2 comprises a functional block diagram of the manner for transmitting multiple data streams on a same frequency of an antennae according to the present disclosure.

Referring now to FIG. 2, there is illustrated a general functional block diagram of the system of the present disclosure wherein the inclusion of an orbital angular momentum "twist" to a provided data stream may be used to transmit multiple data streams upon the same frequency. This increases the bandwidth over a microwave or satellite communications link within the backhaul structure. Multiple data streams 202 are provided to the transmission processing circuitry. Each of these data streams 202 comprises, for example, an end-to-end voice link connection carrying a voice call or a packet connection transmitting non-circuit switch packet data over a data connection. The multiple data streams 202 are processed by the modulator/demodulator circuitry 204. The modulator/demodulator 204 modulates the received data stream 202 onto a radio frequency channel that is transmitted over a microwave or satellite connection over the backhaul communications links discussed previously with respect to FIG. 1.

The modulated data stream is provided to the OAM (Orbital Angular Momentum) signal processing block 206. Each of the modulated data streams from the modulator/demodulator 204 are provided a different orbital angular momentum by the OAM signal processing block 206 such that each of the modulated data streams have a unique and different orbital angular momentum associated therewith. Each of the modulated signals having an associated orbital angular momentum are provided to an antenna 208 that transmits each of the modulated data streams having a unique orbital angular momentum on a same frequency. Each frequency having a selected number of bandwidth slots B may have its data transmission capability increased by a factor of the number of degrees of orbital angular momentum L that are provided from the OAM signal processing block 206. Thus, the antenna transmitting signals at a single frequency could transmit B groups of information. The antenna 208 and OAM signal processing block 206 may transmit L×B groups of information according to the configuration described herein.

In the receiving mode, the antenna 208 will receive a frequency, including multiple signals transmitted therein having differing orbital angular momentum signals embedded therein. The antenna 208 forwards these signals to the OAM (Orbital Angular Momentum) signal processing block 206 which separate each of the signals having different orbital angular momentums and provides the separated signals to the modulator/demodulator circuitry 204. The demodulation process then extracts the data stream 202 from the modulated signal and provides it at the receiving end.

Figure 3:
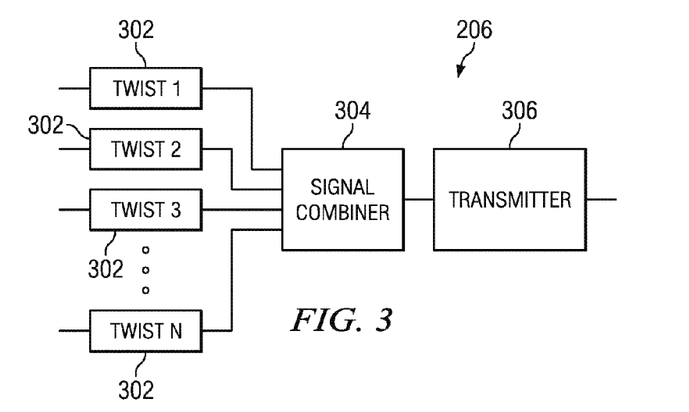
FIG. 3 illustrates the manner in which multiple data streams may be processed to apply an orbital angular momentum to the signal, enabling transmission of multiple signals on a single frequency.

Referring now to FIG. 3, there is provided a more detailed functional description of the OAM signal processing block 206. Each of the input data streams are provided to OAM circuitry 302. Each of the OAM circuitries 302 provides a different orbital angular momentum to the received data stream. The different orbital angular momentums are achieved by applying differing currents for the generation of the signals that are being transmitted to create a particular orbital angular momentum associated therewith. The orbital angular momentum provided by each of the OAM circuitries 302 are unique to the data stream that is provided thereto. An infinite number of orbital angular momentums may be attributed to different input data streams generated many a different current. Each of the separately-generated data streams are provided to a signal combiner 304 which combines the signals onto the same frequency for transmission from the transmitter 306.

Figure 4:
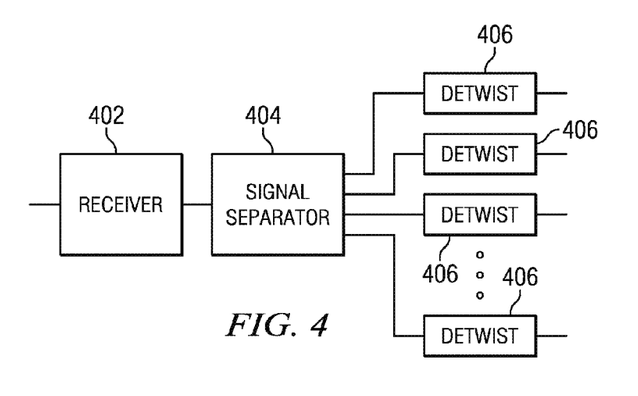
FIG. 4 illustrates the manner for receiving a single frequency, including multiple data streams having different orbital angular momentums within the single frequency to provide the multiple data streams.

Referring now also to FIG. 4, there is illustrated the manner in which the OAM processing circuitry 206 may separate a received backhaul signal into the multiple data streams. The receiver 402 receives the combined OAM signals on the single frequency and provides this information to a signal separator 404. Signal separator 404 separates each of the signals having different orbital angular momentums from the received frequency and provides them to OAM de-twisting circuitry 406. The OAM de-twisting circuitry 406 removes the associated OAM twist from each of the associated signals and provides the received modulated data stream for further processing.

Figure 5:
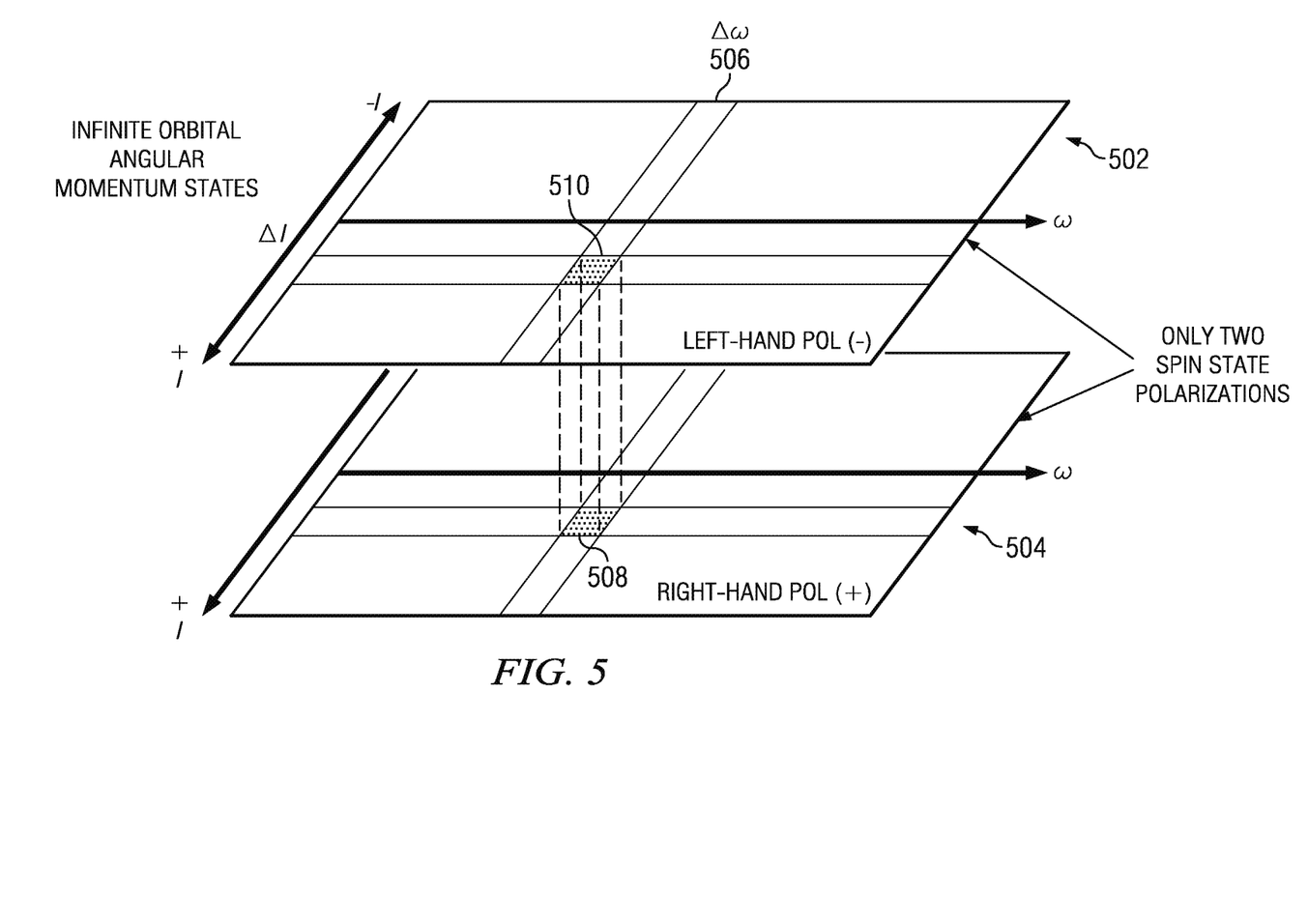
FIG. 5 illustrates how various signals having different orbital angular momentums may be utilized on a single frequency.

FIG. 5 illustrates the manner in which a single frequency having two quantized spin polarizations may provide an infinite number of signals having various orbital angular momentums associated therewith. The l-axis represents the various orbital angular momentum states which may be applied to a particular signal at a selected frequency. Omega ($\omega$) represents the various frequencies to which the signals of differing orbital angular momentum may be applied. The top grid 502 represents the potentially available signals for a left-hand (negative) signal polarization while the bottom grid 504 is for potentially available signals having a right-hand (positive) polarization.

By applying different orbital angular momentum states to a signal at a particular frequency, a potentially infinite number of states may be provided at the frequency. Thus, the state at the frequency $\Delta\omega$ 506 in both the left-hand polarization plane 502 and right-hand polarization plane 504 can provide an infinite number of signals at different orbital angular momentum states $\Delta l$. Blocks 508 and 510 represent a particular signal having an orbital angular momentum $\Delta l$ at a frequency $\Delta\omega$ in both the right-hand polarization plane 504 and left-hand polarization plane 510, respectively. By changing to a different orbital angular momentum within the same frequency $\Delta\omega$ 506, a different signal may also be transmitted. Each angular momentum state corresponds to a different determined current level for transmission from the antennae. By estimating the equivalent currents for generating a particular angular momentum within the radio domain and applying this current for transmission of the signal the transmission of the signal may then be achieved at a desired orbital angular momentum state.

Thus, the illustration of FIG. 5, illustrates two possible angular momentums, the spin angular momentum and the orbital angular momentum. The spin version is manifested within polarizations of macroscopic electromagnetism and has only left and right hand polarizations due to up and down spin directions. However, the orbital angular momentum includes an infinite number of states that are quantized. An antennae having independent channels from l=−3 to l=+3 is illustrated at 514. However, the paths are more than two and can theoretically be infinite through the quantized orbital angular momentum levels.

Using the orbital angular momentum state of the transmitted energy signals, physical information can be embedded within the electromagnetic radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x) \text{ the}$$

where $\nabla$ is the del operator, E is the electric field intensity and B is the magnetic flux density. Using these equations, we can derive 23 symmetries/conserve quantities from Maxwell's original equations. However, there are only ten well-known conserve quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are psedoparticle, or instanton. The interpretation of Maxwell's work actually departs in a significant ways from Maxwell's original intention. In Maxwell's original formulation, Faraday's electrotonic states (the $A\mu$ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the $A\mu$ potentials always have physical meaning The conserved quantities and the electromagnetic field can be represented according to the $\epsilon_0$ conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2)$$

$$\frac{dU^{mech}}{dt} + \frac{dU^{em}}{dt} + \oint_{s'} d^2 x' n' \cdot S = 0$$

The space symmetry, i.e., the conservation of system linear momentum representing the electromagnetic Doppler shift can be represented by the equations:

$$\rho = \sum_i m_i \gamma_i v_i + \varepsilon_0 \int d^3 x (E \times B)$$

$$\frac{dp^{mech}}{dt} + \frac{dp^{em}}{dt} + \oint_{s'} d^2 x' n' \cdot T = 0$$

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E^2| + c^2 |B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' n' \cdot M = 0$$

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i$$

For each singular Fourier mode in real valued representation:

$$J^{em} = i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0,$$

where S is the Poynting vector $$S = \frac{1}{4}(E \times H^* + E^* \times H),$$

and U is the energy density $$U = \frac{1}{4}(\varepsilon |E|^2 + \mu_0 |H|^2),$$

with E and H comprising the electric field and the magnetic field, respectively, and $\epsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right)$$

Figure 6A:
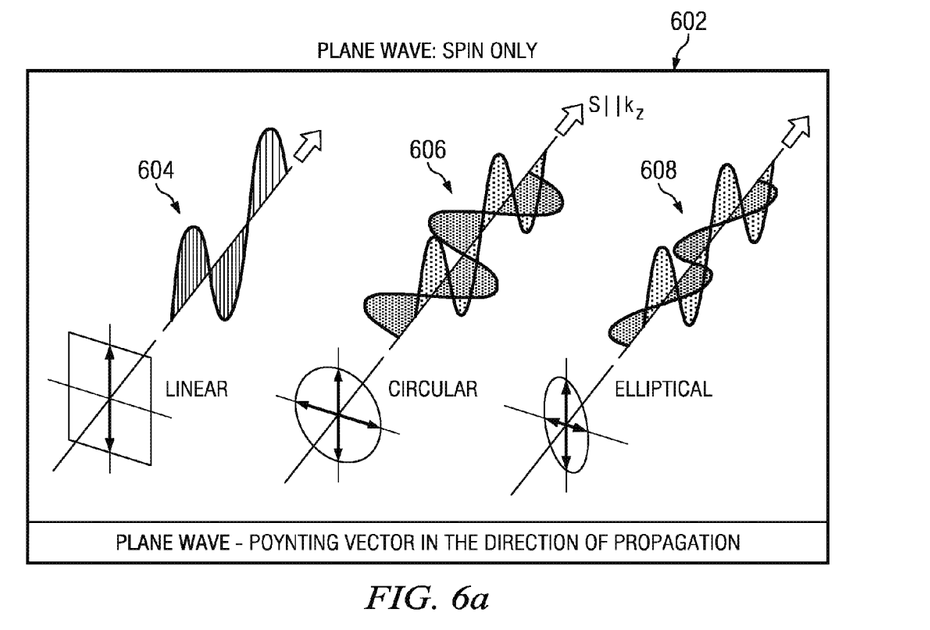
FIG. 6a illustrates a plane wave having spins applied thereto.
Figure 6B:
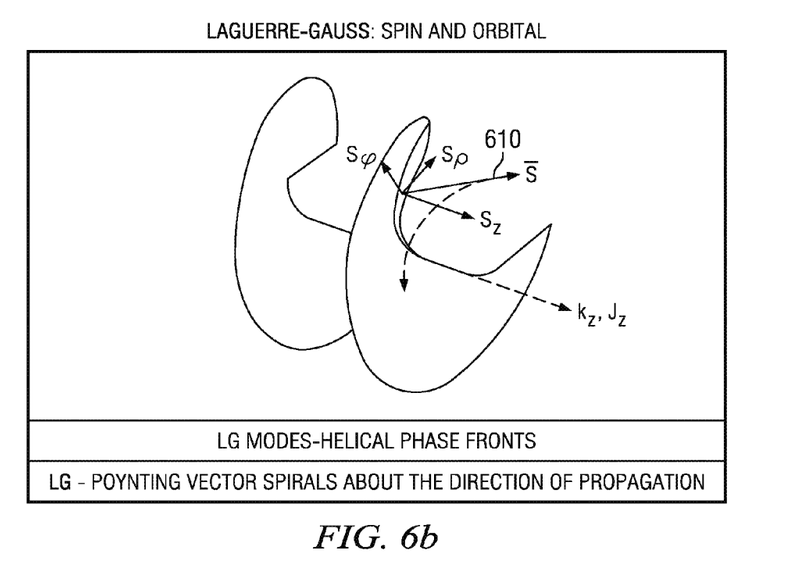
FIG. 6b illustrates a signal having both spin and orbital angular momentum applied thereto.

Referring now to FIGS. 6a and 6b, there is illustrated the manner in which a signal and its associated Poynting vector vary in a plane wave situation where only the spin vector is altered, and a situation wherein the spin and orbital vectors are altered as described herein. In the plane wave situation illustrated generally at 602 when only the spin vectors are altered, the transmitted signal may take one of three configurations. When the spin vectors are in the same direction, a linear signal is provided as illustrated generally at 604. In linear polarization, the vectors for the signal are in the same direction and have a same magnitude. Within a circular polarization 606, the signal vectors are at 90 degrees to each other but have the same magnitude. Within the elliptical polarization 608, the signal vectors are at 90 degrees to each other but have differing magnitudes. The Poynting vector maintains in a constant direction for the signal configurations of FIG. 6a. Referring now to FIG. 6b, when a unique orbital angular momentum is applied to a signal, its Poynting vector S 610 will spiral about the general direction of propagation of the signal. This spiral may be varied in order to enable signals to be transmitted on the same frequency as described herein.

Figure 7A:
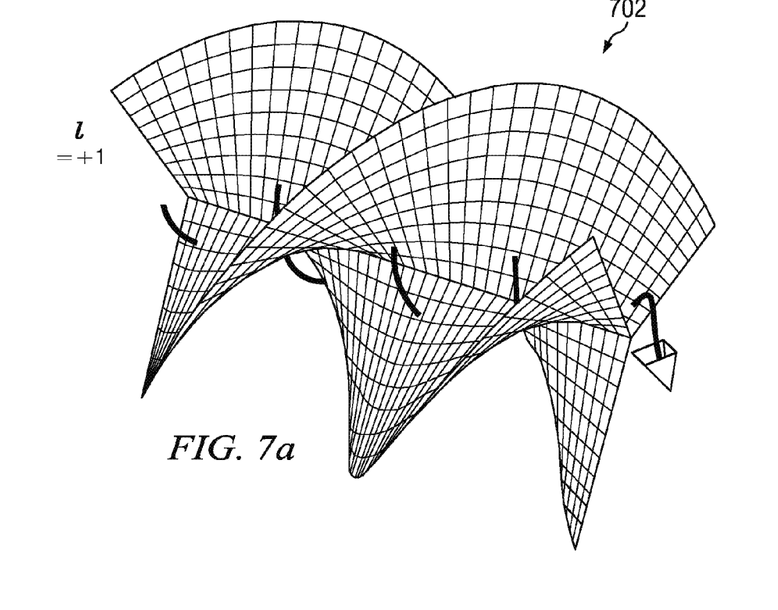
FIGS. 7a-7c illustrate how signals having different orbital angular momentums may be used for generating differing signals on the same frequency.
Figure 7B:
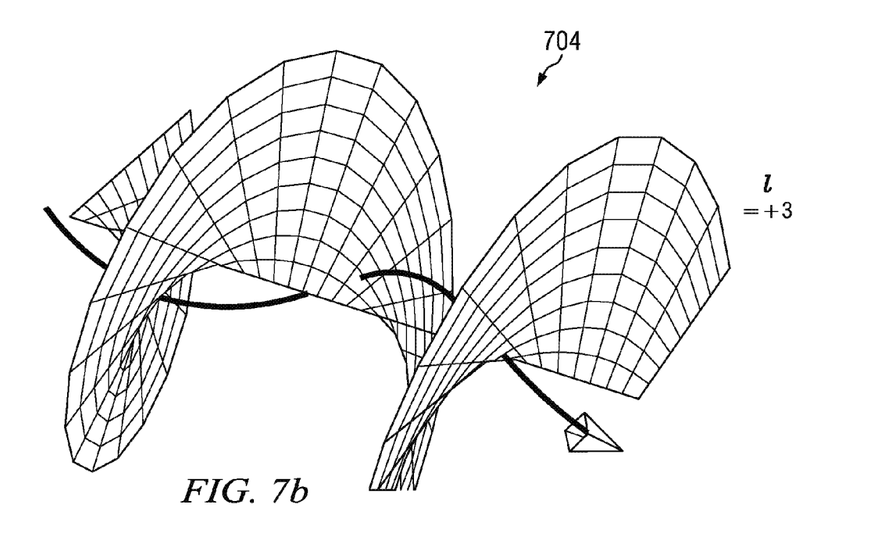
Figure 7C:
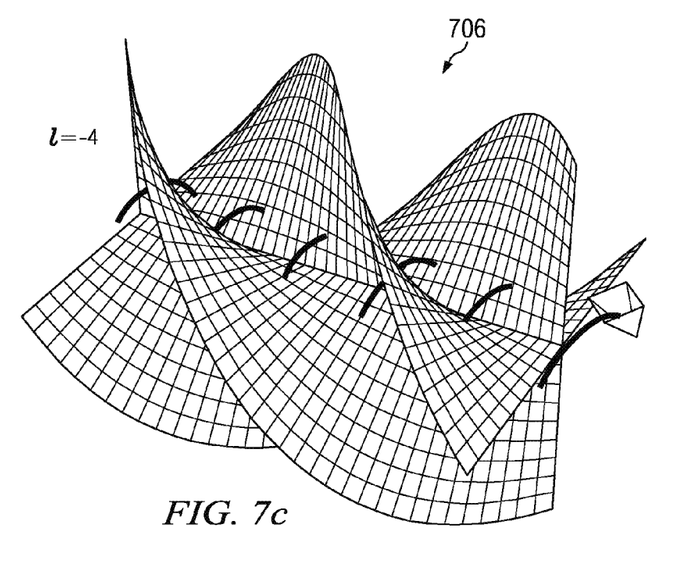

FIGS. 7a-7c illustrate the differences in signals having different helicity (i.e., orbital angular momentums). Each of the spiralizing Poynting vectors associated with the signals 702, 704 and 706 provide a different-shaped signal. Signal 702 has an orbital angular momentum of plus one, signal 704 has an orbital angular momentum of plus three and signal 706 has an orbital angular momentum of minus four. Each signal has a distinct angular momentum and associated Poynting vector enabling the signal to be distinguished from other signals within a same frequency. This allows differing types of information to be transmitted on the same frequency since these signals are separately detectable and do not interfere with each other.

Figure 7D:
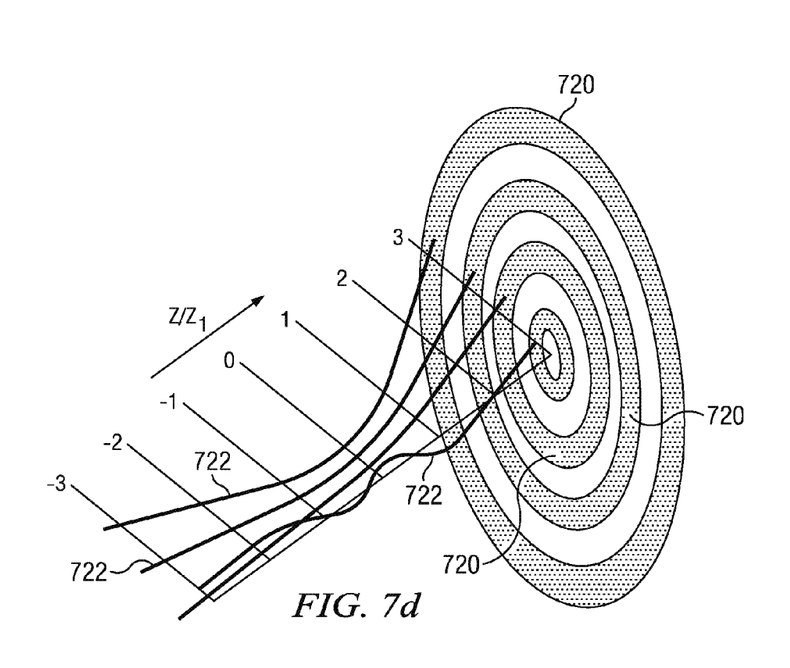
FIG. 7d illustrates the propagation of a pointing vector for various Eigen modes.

FIG. 7d illustrates the propagation of Poynting vectors for various Eigen modes. Each of the rings 720 represent a different Eigen mode or twist representing a different angular momentum for a same frequency. Each of these rings 720 represents a different orthogonal channel. Each of the Eigen modes has a Poynting vector 722 associated therewith.

Figure 8:
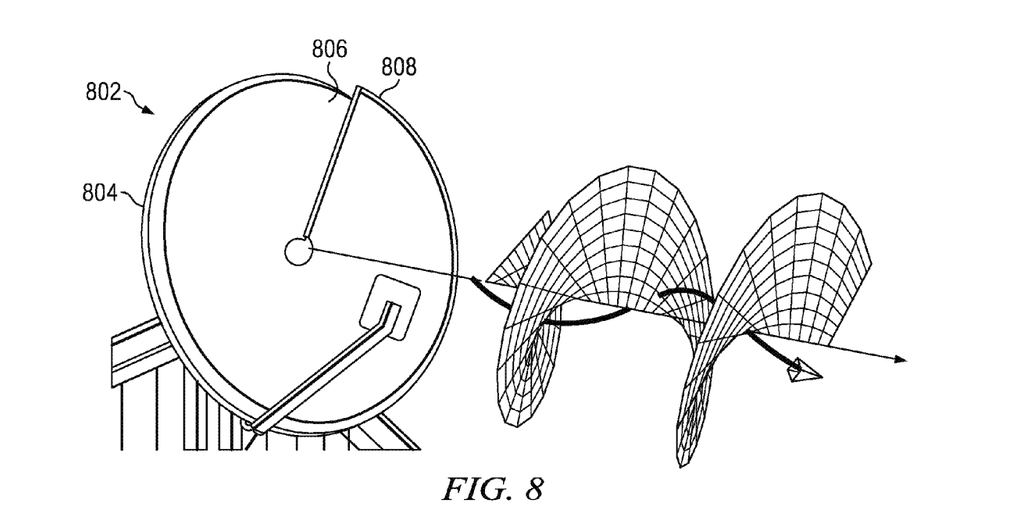
FIG. 8 illustrates an antenna for providing signals with a variable orbital angular momentum.

An antenna that may provide signals at a same frequency having different angular momentums is illustrated in FIG. 8. The antenna 802 includes a dish 804 having a generally circular perimeter. The antenna dish 804 forms a helical plate. The plate comprises a helical surface rising from a lowest segment 806 to a highest segment 808 that are separated by a distance D. The thickness of the antenna increases from the line 806 to the line 808 as you travel around the circumference of the dish. The antenna 802 will transmit signals having a selected orbital angular momentum wherein the amount of orbital angular momentum is proportionate to the current used for generating the antenna signal from the antenna.

Figure 9:
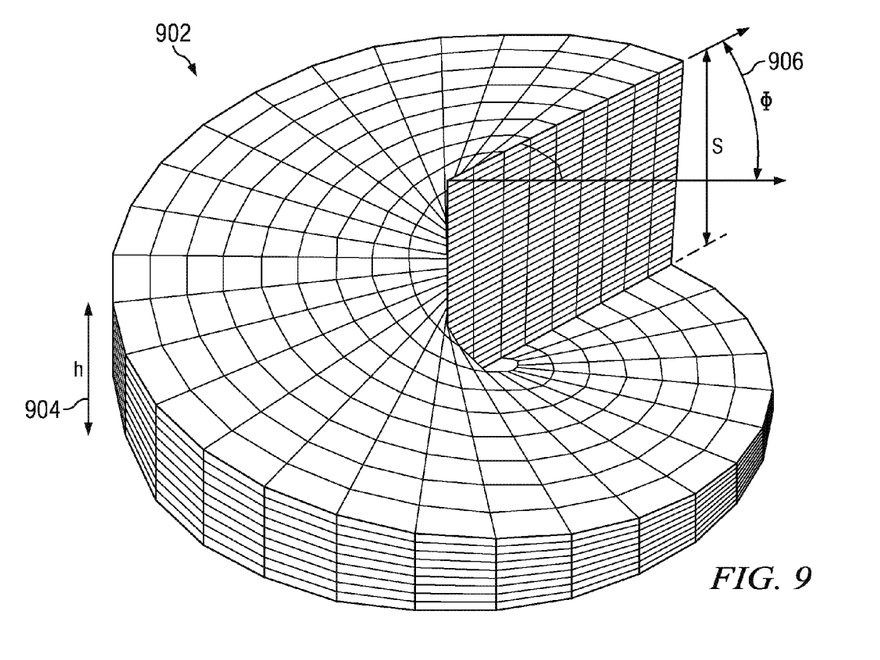
FIG. 9 illustrates the spiral phase plate of the antenna used for transmitting the signals according to the present disclosure.

Referring now to FIG. 9, there is illustrated the manner in which the antenna of FIG. 8 imparts an angular momentum to the signal transmitted therefrom. The spiral phase plate 902 of the antenna has a refractive index of N. The thickness of the phase plate H 904 is proportional to the azimuthal position given by Θ 906. The spiral phase plate 902 enables signals transmitted from the phase of the antenna to have differing angular momentums associated therewith dependent upon the current that is used for generating a particular signal associated with a data stream. Thus, each data stream will be generated using a different current and the spiral phase plate 902 operating in conjunction with the current level used to generate the data stream at a particular frequency will impart a unique orbital angular momentum to the transmitted signal. In this manner, multiple data streams transmitted using multiple current levels from the same spiral phase plate will enable a single frequency to include multiple data streams therein each having a different, unique orbital angular momentum.

It will be appreciated by those skilled in the art having the benefit of this disclosure that this system and method for increased bandwidth efficiency within microwave backhaul of a telecommunication system provides for the transmission of multiple signals with differing orbital angular momentums. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for transmitting information in a wireless communications system, comprising:
   a first interface for receiving a plurality of input data streams;
   signal processing circuitry for processing each of the received plurality of input data streams to apply a different orbital angular momentum to each of the plurality of input data streams, combining at least two of the plurality of input data streams each having the different angular momentum applied thereto onto a single RF frequency;
   a transmitter for transmitting the single RF frequency having the at least two input data streams, each with the different orbital angular momentums applied thereto over a radio frequency channel on the single RF frequency;
   a receiver for receiving the at least one frequency having the plurality of different orbital angular momentums therein over the radio frequency channel;
   signal separator circuitry for separating each of the plurality of input data streams having the different orbital angular momentum from the received single RF frequency; and
   second signal processing circuitry for removing the different orbital angular momentum from each of the plurality of input data streams.

2. The apparatus of claim 1, wherein the signal processing circuitry further comprises first signal processing circuitry for imparting a different orbital angular momentum to each of the plurality of input streams.

3. The apparatus of claim 2, wherein the first signal processing circuitry generates a different current for each of the plurality of input data streams for imparting the different orbital angular momentum to an input data stream.

4. The apparatus of claim 1, wherein the signal processing circuitry further comprises a combiner for combining at least a portion of the plurality of input data streams having the different angular momentum onto the single RF frequency.

5. The apparatus of claim 1 further including a modulator/demodulator for modulating and demodulating the input data streams.

6. A wireless communications system for transmitting information over a wireless backhaul of a telecommunications system, comprising:
   first transceiver circuitry for transmitting an RF frequency over an RF communications link, wherein the first transceiver circuitry transmits a plurality of data streams on the RF frequency, each of the plurality of data streams on the RF frequency transmitted with a unique orbital angular momentum applied thereto, wherein the first transceiver circuitry further comprises:
first signal processing circuitry for generating the unique orbital angular momentum associated with each of the plurality of data streams;
a signal combiner for combining each of the plurality of data streams having the different orbital angular momentum onto the at least one frequency; and
a transmitter for transmitting the at least one frequency having the plurality of different orbital angular momentums therein over the RF communications link;
second transceiver circuitry for receiving the RF frequency over the RF communications link of the wireless backhaul, wherein the second transceiver circuitry extracts from the RF frequency each of the plurality of data streams having the unique orbital angular momentum applied thereto.

7. The apparatus of claim 6 wherein the first signal processing circuitry generates a different current for each of the plurality of input data streams for imparting the unique orbital angular momentum to an input data stream.

8. The wireless communications system of claim 7, wherein the second transceiver circuitry further includes:
a receiver for receiving the at least one RF frequency having the plurality of different orbital angular momentums therein over the RF communications link;
signal separator circuitry for separating each of the plurality of data streams having the unique orbital angular momentum associated therewith from the received at least one frequency; and
second signal processing circuitry for removing the unique orbital angular momentum from each of the plurality of input data streams.

9. The wireless communications system of claim 6 further including a first antenna for transmitting the at least one RF frequency having the plurality of input data streams, each of the plurality of input data streams having the unique orbital angular momentum therein responsive to information contained in the input data stream.

10. The wireless communications system of claim 9 further including a second antenna for receiving the at least one RF frequency having the plurality of input data streams having the unique orbital angular momentum therein.

11. A wireless communications system for transmitting information between a transmission point and a receiving point of a wireless communications system, comprising:
first transceiver circuitry for transmitting over an RF communications link and second transceiver circuitry for receiving over the RF communications link, wherein the RF communications link comprises:
an RF frequency interconnecting the transmission point and the receiving point on an RF communications link;
a plurality of data streams combined together onto the RF frequency; and
wherein each of the plurality of data streams on the RF frequency are applied to the RF frequency with a unique orbital angular momentum to enable multiple data streams to be transmitted on the RF frequency.

12. The wireless communications link of claim 11, wherein each of the plurality of data streams have a unique current associated therewith for generating the unique orbital angular momentum.

13. A method for transmitting data, comprising:
receiving a plurality of data streams;
applying a unique orbital angular momentum to at least two of the plurality of data streams;
combining the at least two of the plurality of data streams having the unique orbital angular momentum applied thereto onto a single RF frequency of an RF communications link;
transmitting the single RF frequency including the at least two of the plurality of data streams having the unique orbital angular momentum applied thereto over the RF communications link;
receiving the single RF frequency including the at least two of the plurality of data streams having a unique orbital angular momentum over the RF communications link;
separating each of the at least two of the plurality of input data streams having the unique orbital angular momentum from the received single RF frequency; and
removing the unique orbital angular momentum from each of the at least two of the plurality of input data streams.

14. The method of claim 13 wherein the step of imparting further comprises:
generating a unique current for each of the plurality of data streams; and
applying the generated unique current to each of the plurality of data streams.

* * * * *